US012655676B2

(12) United States Patent
Weldin

(10) Patent No.: US 12,655,676 B2
(45) Date of Patent: Jun. 16, 2026

(54) TRIM RETAINER SYSTEMS AND METHODS

(71) Applicant: ANDERSEN CORPORATION, Bayport, MN (US)

(72) Inventor: Aaron Weldin, Dubuque, IA (US)

(73) Assignee: Andersen Corporation, Bayport, MN (US)

( * ) Notice: Subject to any disclaimer, the term of this patent is extended or adjusted under 35 U.S.C. 154(b) by 152 days.

(21) Appl. No.: 18/592,659

(22) Filed: Mar. 1, 2024

(65) Prior Publication Data

US 2024/0295142 A1 Sep. 5, 2024

Related U.S. Application Data

(60) Provisional application No. 63/449,677, filed on Mar. 3, 2023.

(51) Int. Cl.
*E06B 3/58* (2006.01)

(52) U.S. Cl.
CPC .................................. *E06B 3/5821* (2013.01)

(58) Field of Classification Search
CPC . E06B 1/08; E06B 3/302; E06B 3/303; E06B 3/5835; E06B 3/5828; E06B 3/5821; E06B 3/5807; E06B 2003/6223
See application file for complete search history.

(56) References Cited

U.S. PATENT DOCUMENTS

| | | | | |
|---|---|---|---|---|
| 4,337,604 A | 7/1982 | Bürgers | | |
| 4,702,050 A | 10/1987 | Giguere | | |
| 7,877,939 B2 * | 2/2011 | Knapp | E06B 3/5828 | 52/204.55 |
| 8,904,719 B2 | 12/2014 | Knapp | | |
| 11,643,866 B1 * | 5/2023 | Roberts | E06B 3/5409 | 52/204.64 |
| 11,680,440 B2 * | 6/2023 | Eisenbarth | E06B 3/549 | 52/209 |
| 2009/0031651 A1 * | 2/2009 | Knapp | E06B 3/5481 | 52/204.67 |
| 2020/0109595 A1 * | 4/2020 | Woodward | E06B 3/6715 | |
| 2020/0232269 A1 * | 7/2020 | Eisenbarth | E06B 3/26 | |
| 2023/0272666 A1 * | 8/2023 | Eisenbarth | E06B 3/26 | 52/209 |

FOREIGN PATENT DOCUMENTS

| | | | | |
|---|---|---|---|---|
| DE | 102008017169 A1 * | 10/2009 | E06B 3/5828 |
| EP | 3369873 A1 | 9/2018 | |
| GB | 2290577 A | 1/1996 | |
| GB | 2300213 A * | 10/1996 | E06B 3/303 |
| GB | 2345938 A | 7/2000 | |

* cited by examiner

*Primary Examiner* — Christine T Cajilig
(74) *Attorney, Agent, or Firm* — Mueting Raasch Group

(57) ABSTRACT

Trim retainer systems and methods of using the same are described herein. In one or more embodiments, the trim retainer systems provide for gap free installation of trim members on a fenestration unit frame.

19 Claims, 6 Drawing Sheets

TRIM RETAINER SYSTEMS AND METHODS

RELATED APPLICATION

The present application claims the benefit under 35 U.S.C. § 119(e) of U.S. Provisional Patent Application 63/449,677 filed on Mar. 3, 2023, which is hereby incorporated by reference in its entirety.

Trim retainer systems and methods of using the same are described herein.

Glass lites are commonly retained in fenestration unit frames (e.g., window and door sash frames) using glass stops mounted on the frame members of the fenestration units. The frame members extend away from the glass stops and often include interior trim members abutting the glass stops and extending to the free edge of the frame members to provide a desired appearance to the fenestration unit frame.

SUMMARY

Trim retainer systems and methods of using the same are described herein. In one or more embodiments, the trim retainer systems provide for gap free installation of trim members on a fenestration unit frame.

Two issues are associated with the installation of interior trim members on fenestration unit frames. The first issue is the use of visible fasteners to attach the trim members to the fenestration unit frame. Visible fasteners are not preferred for both aesthetics and, if needed, repair reasons.

To avoid the use of visible fasteners, some manufacturers have used splines that fit within a channel (e.g., a kerf) in the fenestration unit frame members and a corresponding channel (e.g., a kerf) in the trim member, using friction, adhesives, etc. to retain the spline in both channels.

While the use of splines avoids the need for visible fasteners, it does not address the problem of tolerance stack-up in normal manufacturing. The tolerance stack-up can result in either a gap between the glass stop and trim member when the stack-up between the fenestration unit components (e.g., the glazing units, frame members, glass stops, trim members, etc.) when the tolerance stack-up is on the low end or interference between the glass stop and the trim member when the tolerance stack-up is on the high end (making assembly of the fenestration units difficult).

In one or more embodiments of the fenestration units described herein, the tolerance stack-up problem is addressed by changing the direction of application of the trim members such that the trim members are installed on the fenestration unit frame in a direction that adjusts for any tolerance stack-up variations. In particular, the trim members can be advanced towards the glass stops such that no gap is present between the trim members and the glass stops.

In one or more embodiments of the trim retainer systems as described herein, the trim members include a retainer channel having a retainer channel depth measured in a direction normal to the major surface of glass lite while the trim fins of retainer clips configured to be received in the retainer channels occupy less than all of the depth of the retainer channel when the trim member contacts the glass stop. This relationship between retainer channel depths and trim fins ensures that the trim members can be advanced into contact with the glass stops such that no gap is present between the trim member and the glass stop.

In one or more embodiments of the trim retainer systems as described herein, assembly of the trim members can be accomplished by translational motion of the trim members. In particular, if the glass lite defines the X-Z plane of a Cartesian coordinate system, the trim members can be attached/assembled on fenestration units by advancing the trim members along the Y-direction over the retainer clips and frame members until the trim members reach the glass stops. Movement of the trim members along the X and/or Z directions can be avoided during the installation process. Limiting movement of the trim members in the X and/or Z directions during installation/assembly can reduce or prevent damage to the trim members located at the ends of the trim member being installed. Limiting movement of the trim members in the X and/or Z directions during installation/assembly can also simplify removal of the trim members for servicing, refinishing, etc. the fenestration unit on which the trim members are installed.

In a first aspect, one or more embodiments of a trim retainer system as described herein includes: a glass lite positioned in a frame opening defined by a plurality of frame members, wherein the glass lite comprises a pair of major surfaces facing opposite directions within the frame opening; a plurality of glass stops positioned on the frame members defining the frame opening, wherein each glass stop comprises a lite surface facing a first major surface of the glass lite and a trim surface facing away from the first major surface of the glass lite; and a plurality of retainer clips, wherein each retainer clip of the plurality of retainer clips is attached to one frame member of the plurality of frame members between the glass stop and the interior edge, and wherein each retainer clip of the plurality of retainer clips comprises a trim fin extending away from the glass stop and the first major surface of the glass lite; and a plurality of trim members, wherein each trim member of the plurality of trim members is positioned adjacent a selected frame member of the plurality of frame members and comprises a stop edge facing the first major surface of the glass lite and a retainer channel opening towards the first major surface of the glass lite; wherein each trim member is retained in position adjacent the selected frame member and the glass stop positioned in the selected frame member by one or more retainer clips of the plurality of retainer clips, wherein, for each trim member of the plurality of trim members, the trim fin of the one or more retainer clips is located in the retainer channel.

In one or more embodiments of the trim retainer systems described herein, the retainer channel, for each trim member of the plurality of trim members, comprises a retainer channel depth measured in a direction normal to the first major surface of the glass lite, and wherein the trim fin of the one or more retainer clips occupies less than all of the depth of the retainer channel when the stop edge of the trim member contacts the trim surface of the glass stop located between the trim member and the glass lite.

In one or more embodiments of the trim retainer systems described herein, for each trim member of the plurality of trim members, the one or more retainer clips comprise a base member positioned adjacent a frame surface of the selected frame member, wherein the base member extends from an opening of the retainer channel towards the glass stop.

In one or more embodiments of the trim retainer systems described herein, for each trim member of the plurality of trim members, the one or more retainer clips comprise: a base member positioned adjacent a frame surface of the selected frame member, wherein the base member extends from the retainer channel towards the glass stop; and a trim member support attached to the base member and extending away from the frame surface of the selected frame member, the trim member support configured to support the trim member above the frame surface at a location between the retainer channel and the glass stop.

In one or more embodiments of the trim retainer systems described herein, wherein the trim fin of the one or more retainer clips defines a trim fin plane oriented generally transverse to the first major surface of the glass lite.

In one or more embodiments of the trim retainer systems described herein, for each trim member of the plurality of trim members, the trim fin of the one or more retainer clips is spaced apart from a frame surface of the selected frame member such that a portion of the trim member is located between the trim fin and the frame surface of the selected frame member.

In one or more embodiments of the trim retainer systems described herein, each frame member of the plurality of frame members comprises a frame channel of formed in the frame member, wherein the frame channel is positioned between the trim surface of a glass stop positioned on the frame member and an interior edge of the frame member in which the frame channel is located; wherein each retainer clip of the plurality of retainer clips comprises a channel fin; and wherein, for each trim member of the plurality of trim members, the channel fin of the one or more retainer clips is located in the frame channel of the selected frame member. In one or more embodiments, at least a portion of the trim member support is located closer to the glass stop than the frame channel. In one or more embodiments, for each trim member of the plurality of trim members, the retainer channel is located between the channel fin of the one or more retainer clips and the interior edge of the selected frame member. In one or more embodiments, the channel fin of each retainer clip of the plurality of retainer clips comprises a first channel fin and each retainer clip further comprises a second channel fin separated from the first channel fin by a base member; wherein the frame channel of each frame member of the plurality of frame members comprises a first frame channel and wherein each frame member comprises a second frame channel formed in the frame member, wherein the second frame channel is positioned between the trim surface of the glass stop positioned on the frame member and the first frame channel; and wherein, when the first channel is located in the first frame channel and the second channel fin is located in the second frame channel, the base member rests on a frame surface of the frame member located between the first frame channel and the second frame channel. In one or more embodiments, the trim fin of each retainer clip of the plurality of retainer clips comprises a first trim fin and wherein each retainer clip comprises a second trim fin, wherein the first trim fin extends away from the first channel fin and the glass lite, and wherein the second trim fin extends away from the second channel fin and towards the glass lite such that the first trim fin and the second trim fin extend away from each other in opposite directions. In one or more embodiments, the second trim fin is configured to support the trim member above the frame surface at a location between the second frame channel and the trim face of the glass stop.

In a second aspect, one or more methods of retaining a trim member in a frame opening of a frame as described herein include: locating a plurality of retainer clips along a perimeter of a glass lite located in a frame opening of a frame, wherein locating each retainer clip of the plurality of retainer clips comprises attaching the retainer clip to a frame member of the frame between a trim surface of a glass stop positioned on the frame member proximate the glass lite and an interior edge of the frame member, and wherein each retainer clip of the plurality of retainer clips comprises a trim fin extending away from the glass lite towards the interior edge of the frame member; and attaching a trim member to the frame member such that the glass stop is located between the trim member and the glass lite, wherein the trim member comprises a stop edge and a retainer channel, wherein attaching the trim member comprises positioning the trim member adjacent the frame member with the stop edge contacting the trim surface of the glass stop and the trim fin of one or more retainer clips of the plurality of retainer clips positioned in the retainer channel.

In one or more embodiments of the methods of retaining a trim member as described herein, the retainer channel comprises a retainer channel depth measured in a direction normal to a first major surface of the glass lite, and wherein the trim fin of the one or more retainer clips of the plurality of retainer clips occupies less than all of the depth of the retainer channel when the stop edge of the trim member contacts the trim surface of the glass stop.

In one or more embodiments of the methods of retaining a trim member as described herein, attaching the trim member comprises advancing the trim member in a direction normal to a plane defined by the glass lite to position the trim member adjacent the frame member with the stop edge contacting the trim surface of the glass stop and the trim fin of the one or more retainer clips of the plurality of retainer clips positioned in the retainer channel.

In one or more embodiments of the methods of retaining a trim member as described herein, the trim fin of the one or more retainer clips is spaced apart from a frame surface of the frame member such that a portion of the trim member is located between the trim fin and the frame surface of the frame member.

In one or more embodiments of the methods of retaining a trim member as described herein, each retainer clip of the plurality of retainer clips comprises a base member positioned adjacent a frame surface of the frame member, wherein the base member extends from the frame channel towards the glass stop.

In one or more embodiments of the methods of retaining a trim member as described herein, attaching each retainer clip of the plurality of retainer clips to the frame member comprises locating a channel fin of the retainer clip in a frame channel formed in a frame member of the frame, wherein the frame channel is positioned between a trim surface of a glass stop positioned on the frame member proximate the glass lite and an interior edge of the frame member. In one or more embodiments, the retainer channel is located between the channel fins of the retainer clips and the interior edge of the selected frame member.

In one or more embodiments of the methods of retaining a trim member as described herein, the method comprises supporting at least a portion of the trim member above a frame surface of the frame member at a location between the retainer channel and the glass stop using the plurality of retainer clips. In one or more embodiments, each retainer clip of the plurality of retainer clips comprises a base member positioned adjacent a frame surface of the frame member, wherein the base member extends from the retainer channel towards the glass stop, and a trim member support attached to the base member, the trim member support extending away from the frame surface of the frame member at a location between the retainer channel and the glass stop, and wherein supporting the trim member above the frame surface comprises supporting the trim member using the trim member supports of the plurality of retainer clips.

Where used herein, positional terms such as “top,” “bottom,” “above,” “below,” etc. are used for reference relative to each other when the trim retainer systems described herein are installed in a fenestration unit. These terms should not be construed narrowly and may, in actual use, be reversed. For example, a first component described as being above a second component may, in actual use, be located below the second component.

Where used herein, the terms "exterior" and "interior" are used only in a relative sense, for example, an exterior surface and an interior surface may be used to describe surfaces located on opposite sides of a fenestration unit. In actual use, and exterior surface could be found within the interior of a building or other structure where the surface would conventionally be defined as an interior surface, while an interior surface could be found outside of a building or other structure where the surface would conventionally be defined as an exterior surface.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the trim retainer systems and methods of using the same as described herein. Rather, a more complete understanding of the invention will become apparent and appreciated by reference to the following Description of Illustrative Embodiments and claims in view of the accompanying figures of the drawing.

BRIEF DESCRIPTION OF THE VIEWS OF THE DRAWING

Each of the figures described herein include axes corresponding to a three dimensional Cartesian coordinate system to facilitate an understanding of the illustrative embodiments of the invention depicted in the figures and described herein. It should be understood that the Cartesian coordinate systems depicted in FIGS. 3-8 and 10-11 are with respect to the trim members and retainer clips as attached to the bottommost frame members as depicted in FIGS. 1, 2, and 9 and are provided for reference only.

DESCRIPTION OF ILLUSTRATIVE EMBODIMENTS

Figure 1:
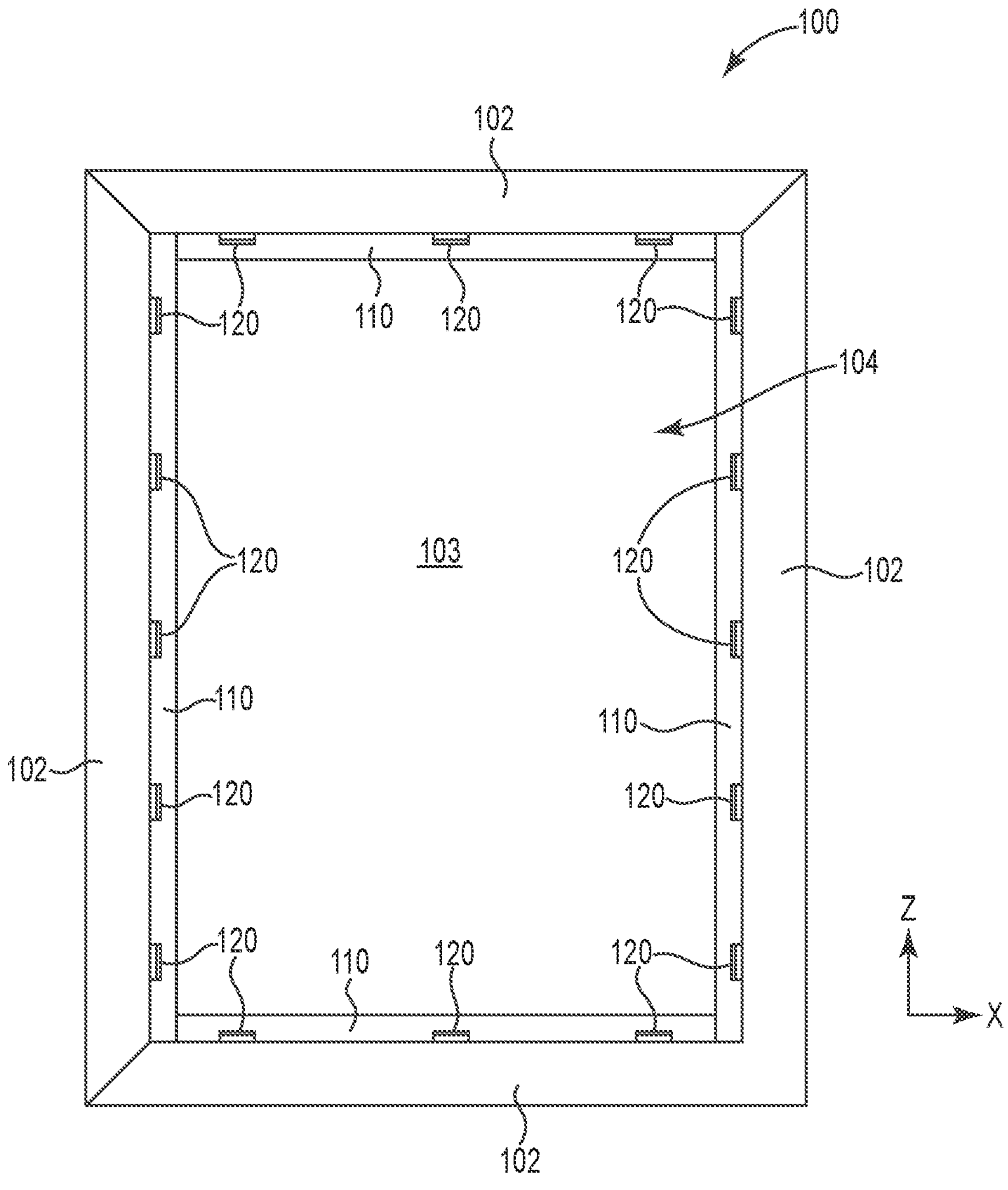
FIG. 1 is a plan view of one illustrative embodiment of a fenestration unit frame including a glass lite including a plurality of retainer clips positioned about a perimeter of the frame as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

One illustrative embodiment of a fenestration unit including illustrative embodiments of retainer clips of the trim retainer systems described herein is depicted in FIG. 1. The depicted fenestration unit 100 includes a glass lite 104 located within a frame opening defined by frame members 102 surrounding the frame opening and the glass lite 104 located therein. The glass lite 104 includes a major surface 103 located in the XZ plane. A set of glass stops 110 are positioned within the frame opening and attached to the frame members 102 to retain the glass lite 104 in the frame opening.

A set of retainer clips 120 are positioned about the perimeter of the glass lite 104 on the surfaces of the frame members 102 between the glass stops 110 and interior edges of the frame members 102. The depicted number and/or arrangement of retainer clips 120 is illustrative in nature only and, depending on the size of the frame, any expected forces to be applied to the trim members retained by the retainer clips 120, etc., the number of retainer clips 120 and/or spacing thereof may be increased or decreased. For example, in one or more embodiments, only one (typically longer) retainer clip 120 may be provided on each of the frame members 102.

Figure 2:
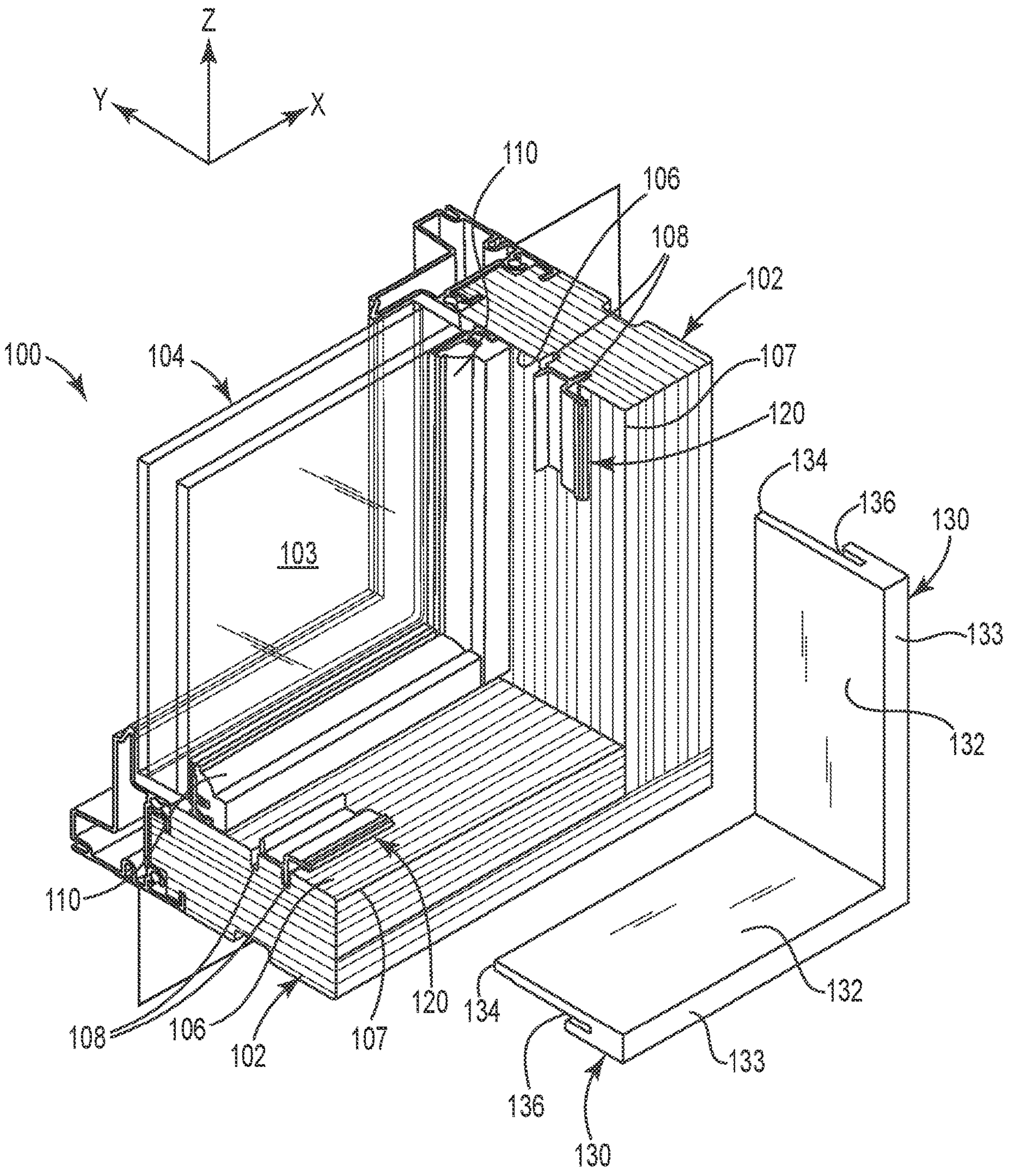
FIG. 2 is an enlarged perspective cross-sectional view of a portion of one illustrative embodiment of a trim retainer system as described herein.

With reference to FIG. 2, a cross-sectional view of the corner of the fenestration unit 100 of FIG. 1 is depicted to illustrate various features of one or more embodiments of the trim retainer systems described herein. The cross-sections of FIG. 2 are taken along the X-Y and Y-Z planes. Among the components depicted in FIG. 2 are a pair of frame members 102, glass lite 104 including major surface 103 along with glass stops 110 positioned against the major surface 103 of glass lite 104 to retain glass lite 104 in the fenestration unit 100. Frame members 102 of the fenestration unit 100 include a frame surface 106 extending from the glass stops 110 to an interior edge 107.

Figure 8:
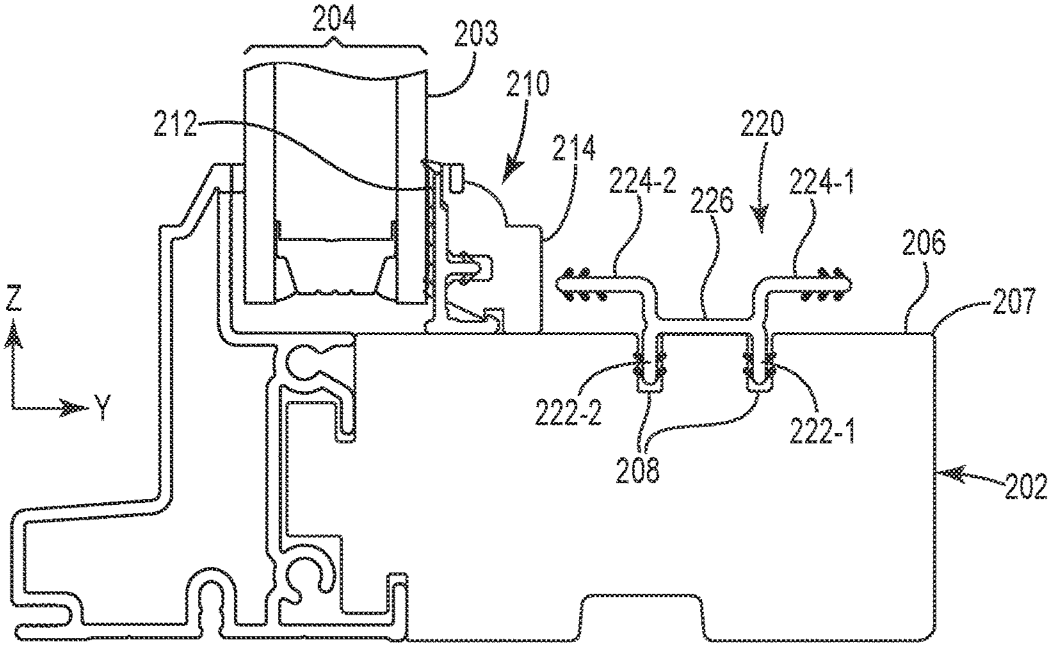
FIG. 8 is an enlarged cross-sectional view of the retainer clip of FIG. 6 attached to a frame member of a fenestration unit as described herein.

It should be noted (in conjunction with the enlarged cross-sectional view of FIG. 5) that the glass stops 110 include both a retaining rail and a cover that are collectively referred to as a glass stop 110 (and the glass stop 210 depicted in connection with FIG. 8 includes a similar construction). In one or more alternative embodiments, the glass stops against which the trim members held in place by the retainer clips described herein are seated could be provided as a single component. Whether the glass stops described herein have a multi-component or single component construction, the glass stops 110/210 provide a lite surface 112/212 facing the major surface 103/203 of the glass lite 104/204 and a trim surface 114/214 facing away from the major surface 103/203 of the glass lite 104/204.

In the depicted illustrative embodiment, a pair of frame channels 108 are formed in each of frame members 102. The frame channels 108 are located between the glass stop 110 and the interior edge 107 of the frame members 102. Although a pair of frame channels 108 are depicted in frame members 102, in one or more alternative embodiments, a single frame channel may be provided in frame members of fenestration units using the trim retainer systems described herein, while in other alternative embodiments, three or more frame channels may be provided in the frame members. The frame channels 108 may, in one or more embodiments, preferably be oriented parallel to the major surface 103 of glass lite 104 as well as other features such as, e.g., glass stops 110, interior edges 107, etc. In one or more embodiments, the frame channels 108 may extend over the full length of each of the frame members 102, while in one or more alternative embodiments, frame channels 108 may be provided in discrete sections of the frame member 102 (i.e., the frame channels may not be continuous along the length of the frame members 102).

One illustrative embodiment of a retainer clip 120 is depicted on each of the frame members 102 in the view of FIG. 2. The retainer clips 120 are, in the depicted embodiment, positioned in the frame channel 108 closer to the interior edges 107 of frame members 102. The retainer clips 120 and various features thereof will be described in more detail below.

Also depicted in FIG. 2 are a pair of trim members 130 positioned for placement on the frame surface 106 of the frame members 102. As discussed herein, the trim members 130 provide a finished appearance to the interior surfaces of the frames of fenestration units. Each of the trim members 130 includes an interior surface 132, an interior edge 133, and a stop edge 134, with the interior surface 132 extending from the interior edge 133 to the stop edge 134. The depicted illustrative embodiment of trim members 130 also includes a retainer channel 136 on the underside of the trim member 130, with the retainer channel 136 facing the retainer clips 120 and glass lite 104 and positioned on the surface 106 of frame members 102.

As described herein, the trim members 130 can, in one or more embodiments, be attached/assembled on fenestration unit 100 by advancing the trim members 130 along the Y-direction over the retainer clips 120 and frame members 102 until the trim members 130 reach the glass stops 110. In one or more embodiments, attaching/assembling the trim members 130 can be described as advancing the trim members in a direction normal to the plane defined by the glass lite 104 (e.g., defined by the major surface 103 of glass lite 104). Although the two trim members 130 depicted in FIG. 2 are arranged as they would be arranged when installed on the fenestration unit 100, it will be understood that the trim members 130 would typically (but not necessarily) be installed serially, i.e., one at a time.

As also described herein, movement of the trim members 130 along the X and/or Z directions can be avoided during the installation process. Limiting movement of the trim members 130 in the X and/or Z directions during installation/assembly can reduce or prevent damage to the trim members 130 located at the ends of the trim member being installed. Limiting movement of the trim members 130 in the X and/or Z directions during installation/assembly can also simplify removal of the trim members 130 for servicing, refinishing, etc. of the fenestration unit 100 on which the trim members 130 are installed.

Figure 3:
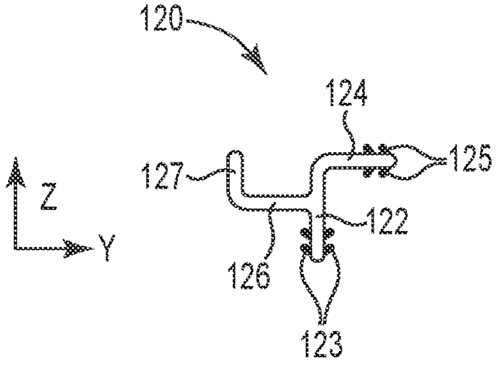
FIG. 3 is an end view of one illustrative embodiment of a retainer clip that may be used in one or more embodiments of trim retainer systems as described herein.

FIG. 3 is an end view of the illustrative embodiment of a retainer clip 120 removed from the frame members 102. The retainer clip 120 includes a channel fin 122 and a trim fin 124. Retainer clip 120 also includes a base member 126 extending away from the channel fin 122 as well as a trim member support arm 127.

Channel fin 122 of retainer clip 120 includes retention features 123 configured to retain the channel fin 122 in a frame channel 108 while trim fin 124 of retainer clip 120 includes retention features 125 configured to retain the trim fin 124 in the retainer channel 136 of a trim member 130. In one or more embodiments, the retention features 123/125 may be in the form of barbs, elastically resilient members, etc. that resist removal of the respective fin 122/124 from a channel within which the fin is located.

Figure 4:
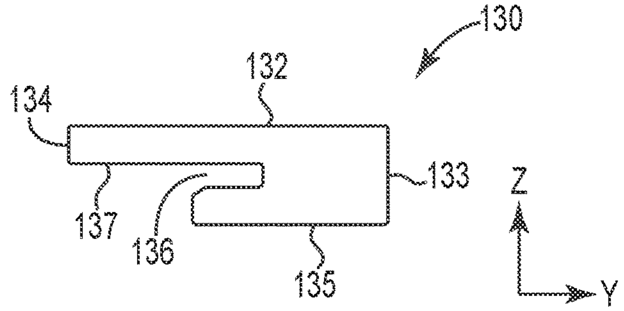
FIG. 4 is an end view of one illustrative embodiment of a trim member that may be used in one or more embodiments of trim retainer systems as described herein.

FIG. 4 is an end view of the illustrative embodiment of a trim member 130. The trim member 130 includes interior surface 132 extending between an interior edge 133 and a stop edge 134. As also described herein, the trim member 130 includes a retainer channel 136 opening towards the stop edge 134. The depicted illustrative embodiment of trim member 130 also includes a rear base surface 135 extending from the interior edge 133 towards the stop edge 134. In one or more embodiments, the rear base surface 135 rests on the frame surface 106 of a fenestration unit frame member 102 on which the trim member 130 is located. The depicted illustrative embodiment of trim member 130 also includes a forward base surface 137 on the underside of the trim member 130, with the forward base surface 137 extending from the stop edge 134 towards the retainer channel 136.

Figure 5:
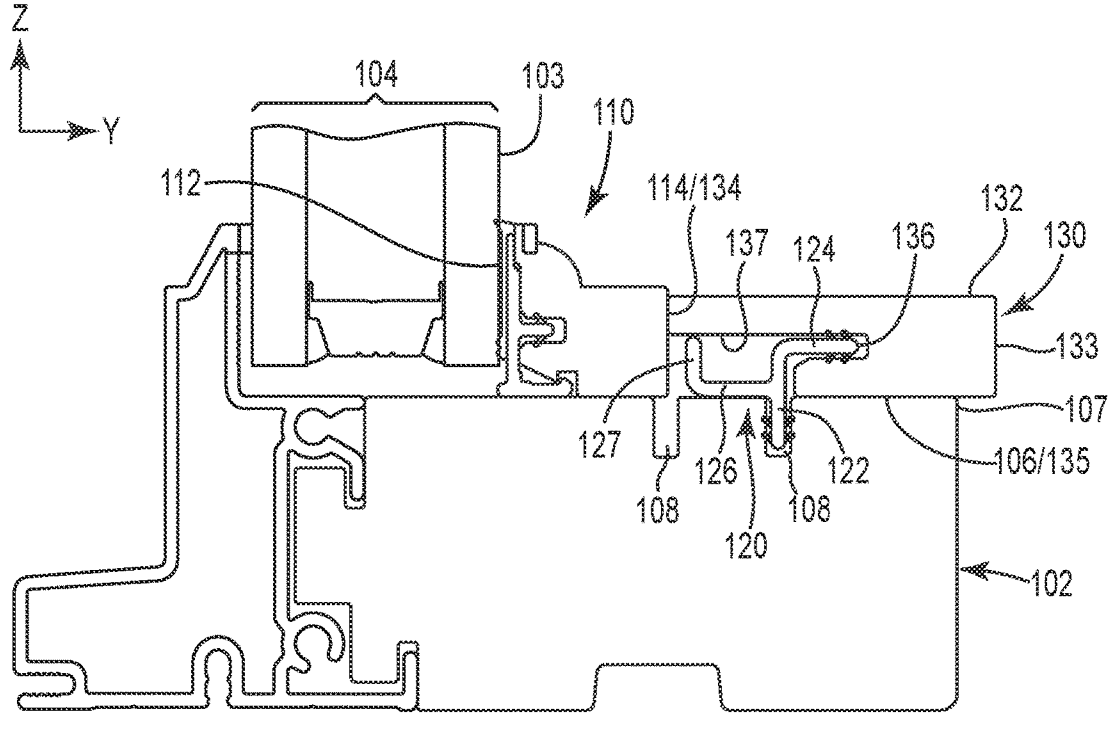
FIG. 5 is an enlarged cross-sectional view of the trim retainer system of FIG. 2 incorporating the components depicted in end views in FIGS. 3-4.

FIG. 5 is an end view of the components depicted in FIGS. 2-4 as assembled on a fenestration unit. In the view of FIG. 5, the lite surface 112 of glass stop 110 is depicted as bearing against the major surface 103 of glass lite 104 to retain glass lite 104 in position on frame member 102. Glass stop 110 includes a trim surface 114 facing the interior edge 107 of frame member 102 as well as the stop edge 134 of trim member 130.

Also depicted in FIG. 5 is a retainer clip 120 with a channel fin 122 positioned in one of the frame channels 108 formed in frame member 102 as well as a trim fin 124 positioned in retainer channel 136 in trim member 130. In one or more embodiments, the trim fin 124 may be described as extending away from the glass lite 104 in a direction normal to the major surface 103 of glass lite 104.

In one or more embodiments, the trim fin 124 of the retainer clip 120 may be described as defining a trim fin plane oriented generally transverse to a channel fin plane defined by the channel fin 122 of retainer clip 120 and/or the X-Z plane defined by the major surface 103 of glass lite 104. With reference to the trim retainer system depicted in FIG. 5, the trim fin plane defined by trim fin 124 would generally lie in an X-Y plane while the channel fin plane defined by the channel fin 122 would lie in an X-Z plane (which would typically align with the major surface 103 of glass lite 104). The trim fin plane may be described as generally transverse to the X-Z plane or the channel fin plane when it is oriented at an angle of 90 degrees plus or minus 5 degrees with the respective plane.

As described herein, trim fin 124 is configured to be retained in retainer channel 136 on trim member 130 to restrict movement of the trim member 130 along the Z axis (i.e., away from the surface 106 of frame member 102) as well as movement along the Y axis (i.e., away from the glass stop 110 and glass lite 104).

In the depicted illustrative embodiment of the trim retainer system as depicted in FIG. 5, the retainer channel 136 may be described as being located between the channel fin 122 of retainer clip 120 in the interior edge 107 of the frame member 102.

Also in the depicted illustrative embodiment of the trim retainer system as depicted in FIG. 5, the trim fin 124 of retainer clip 120 may be described as being spaced apart from the frame surface 106 of frame member 102 such that a portion of the trim member 130 is located between the trim fin 124 and the frame surface 106 of frame member 102.

In the depicted illustrative embodiment of the trim retainer system as depicted in FIG. 5, the trim fin 124 and retainer channel 136 are configured to restrict, but not prevent, movement of the trim member 130 along the Y axis. In one or more alternative embodiments of the trim retainer systems as described herein, the trim fins and retainer channels of trim members may be configured to prevent movement of a trim member along the Y axis without permanent damage or deformation to one or both of the trim fin and retainer channel.

In one or more embodiments of the trim retainer systems as described herein, the retainer channel may be described as having a retainer channel depth measured in a direction normal to the major surface of glass lite (i.e., along the Y axis in FIG. 5) while the trim fin of a retainer clip configured for retention within the retainer channel occupies less than all of the depth of the retainer channel when the stop edge of the trim member contacts the trim surface of a glass stop located between the trim member and a glass lite of the fenestration unit. This relationship between retainer channel depth measured relative to the stop edge of a trim member ensures that the stop edge of the trim member can be advanced into contact with the trim surface of a glass stop such that no gap is present between the stop edge of the trim member and the trim surface of the glass stop.

As embodied in the depicted illustrative embodiment of retainer clip 120 and trim member 130, the retainer channel 136 has a retainer channel depth measured along the Y axis and the trim fin 124 of retainer clip 120 occupies less than all of the depth of the retainer channel 136 when the stop edge 134 of trim member 130 contacts the trim surface 114 of the glass stop 110 located between the trim member 130 and the glass lite 104. As noted above, the relationship between retainer channel depth measured relative to the stop edge 134 of trim member 130 ensures that the stop edge 134 of trim member 130 can be advanced into contact with the trim surface 114 of glass stop 110 such that no gap is present between the stop edge 134 of trim member 130 and the trim surface 114 of glass stop 110.

The depicted illustrative embodiment of retainer clip 120 also includes a base member 126 extending towards the glass stop 110 as well as an optional trim member support arm 127 extending away from the frame surface 106 of frame member 102. Trim support arm 127 is configured to support the trim member 130 above the frame surface 106 at a location between the frame channel 108 in which channel fin 122 is located and the glass stop 110. Support of the trim member 130 between the frame channel 108 in which channel fin 122 is located and the glass stop 110 may prevent unwanted rotation of the trim member 130 when, as depicted in the illustrative embodiment of trim member 130 the thickness of the trim member proximate the stop edge 134 is less than the thickness of the trim member 130 proximate the interior edge 133. As embodied in the depicted illustrative embodiment of trim member 130, the thickness of the trim member 130 proximate the stop edge 134 is measured between the forward base surface 137 and interior surface 132 of trim member 130 while the thickness of the trim member 130 proximate the interior edge 133 is measured between the rear base surface 135 and the interior surface 132 of trim member 130.

In one or more embodiments, base member 126 of retainer clip 120 may also serve to stabilize retainer clip 120 on the frame surface 106 of frame member 102 and/or provide additional rigidity to the retainer clip 120 and/or retain a trim member 130 in position whether or not a trim member support arm 127 is needed or provided. In the depicted embodiment, the base member 126 may be described as positioned adjacent the frame surface 106 of frame member 102 and extending away from the trim fin 124 and/or away from the frame channel 108 in which channel fin 122 is located towards the glass stop 110.

Figure 6:
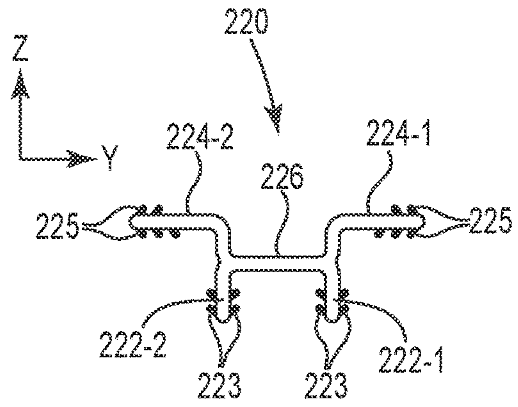
FIG. 6 is an end view of another illustrative embodiment of a retainer clip that may be used in one or more embodiments of trim retainer systems as described herein.
Figure 7:
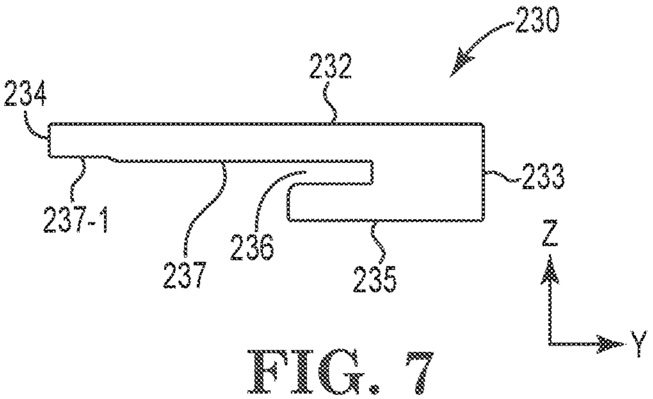
FIG. 7 is an end view of another illustrative embodiment of a trim member that may be used in one or more embodiments of trim retainer systems as described herein.

One alternative embodiment of a trim retainer system that may be used with one or more fenestration units as described herein is depicted in FIGS. 6-8.

In particular, FIG. 6 is an end view of the illustrative embodiment of a retainer clip 220 removed from the frame member 202 in FIG. 8. The retainer clip 220 includes a first channel fin 222-1 and a second channel fin 222-2. Retainer clip 220 also includes a first trim fin 224-1 and a second trim fin 224-2. Retainer clip 220 also includes a base member 226 extending between the first and second channel fins 222-1 and 222-2.

Channel fins 222-1 and 222-2 of retainer clip 220 include retention features 223 configured to retain the channel fins in a frame channel 208 while trim fins 224-1 and 224-2 include retention features 225 configured to retain the trim fin in a retainer channel of a trim member. In one or more embodiments, the retention features 223/225 may be in the form of barbs, elastically resilient members, etc. that resist removal of the respective fin on which they are found from a channel within which the fin is located.

FIG. 7 is an end view of the illustrative embodiment of a trim member 230 configured for use in the trim retainer system depicted in FIG. 8. The trim member 230 includes interior surface 232 extending between an interior edge 233 and a stop edge 234. As also described herein, the trim member 230 includes a retainer channel 236 opening towards the stop edge 234. The depicted illustrative embodiment of trim member 230 also includes a rear base surface 235 extending from the interior edge 233 towards the stop edge 234. In one or more embodiments, the rear base surface 235 rests on the frame surface 206 of a fenestration unit frame member 202 on which the trim member 230 is located. The depicted illustrative embodiment of trim member 230 also includes a forward base surface 237 on the underside of the trim member 230, with the forward base surface 237 extending from the stop edge 234 towards the retainer channel 236.

FIG. 8 is an end view of the components depicted in FIGS. 6-7 as assembled on a fenestration unit. In the view of FIG. 8, the lite surface 212 of glass stop 210 is depicted as bearing against the major surface 203 of glass lite 204 to retain glass lite 204 in position on frame member 202. Glass stop 210 includes a trim surface 214 facing the interior edge 207 of frame member 202 as well as the stop edge 234 of trim member 230.

Also depicted in FIG. 8 is retainer clip 220 with both channel fins 222-1 and 222-2 positioned in a frame channel 208 formed in frame member 202. Trim fin 224-1 is positioned above frame surface 206 and positioned to be received in retainer channel 236 of trim member 230 when trim member 230 is advanced towards the glass stop 210 and glass lite 204. Trim fin 224-1 may be described as extending away from the glass lite 204 in a direction normal to the major surface 203 of glass lite 204. Although retainer clip 220 also includes a second trim fin 224-2, retainer clip 220 includes the additional trim fin to provide a retainer clip 220 that can be inserted into frame channels 208 in either orientation to simplify assembly of the trim retainer system during manufacturing.

In one or more embodiments, the trim fin 224-1 of the retainer clip 220 may be described as defining a trim fin plane oriented transverse to a channel fin plane defined by the channel fin 222-1 of retainer clip 220 and the major surface 203 of glass lite 204. With reference to the trim retainer system depicted in FIG. 8, the trim fin plane defined by trim fin 224-1 would lie in an X-Y plane while the channel fin plane defined by the channel fin 222-1 would lie in an X-Z plane (which would typically align with the major surface 203 of glass lite 204).

As described herein, trim fin 224-1 is configured to be retained in retainer channel 236 on trim member 230 to restrict movement of the trim member 230 along the Z axis (i.e., away from the surface 206 of frame member 202) as well as movement along the Y axis (i.e., away from the glass stop 210 and glass lite 204).

In the depicted illustrative embodiment of retainer clip 220 and trim member 230, the retainer channel 236 has a retainer channel depth measured along the Y axis and the trim fin 224-1 of retainer clip 220 occupies less than all of the depth of the retainer channel 236 when the stop edge 234 of trim member 230 contacts the trim surface 214 of the glass stop 210 located between the trim member 230 and the glass lite 204. As noted above, the relationship between retainer channel depth measured relative to the stop edge 234 of trim member 230 ensures that the stop edge 234 of trim member 230 can be advanced into contact with the trim surface 214 of glass stop 210 such that no gap is present between the stop edge 234 of trim member 230 and the trim surface 214 of glass stop 210.

Retainer clip 220 also includes a base member 226 extending between channel fins 222-1 and 222-2. While the second trim fin 224-2 provides the ability to insert the retainer clip 220 in frame channels 208 in any orientation, the second trim fin 224-2 extending towards the glass stop 210 and glass lite 204 may also be configured to support the trim member 230 above the frame surface 206 at a location between the frame channels 208 and the glass stop 210. Support of the trim member 230 between the frame channels 208 and the glass stop 210 may prevent unwanted rotation of the trim member 230 when, as depicted in the illustrative embodiment of trim member 230 the thickness of the trim member proximate the stop edge 234 is less than the thickness of the trim member 230 proximate the interior edge 233. As embodied in the depicted illustrative embodiment of trim member 230, the thickness of the trim member 230 proximate the interior edge 233 is measured between the rear base surface 235 and the interior surface 232 of trim member 230. The thickness of the trim member 230 proximate the stop edge 234 is measured between the forward base surface 237 and interior surface 232 of trim member 230. In the depicted illustrative embodiment, the forward base surface 237 includes a relief area 237-1 to accommodate the additional thickness of retention features 225 on trim fin 224-2.

Figure 9:
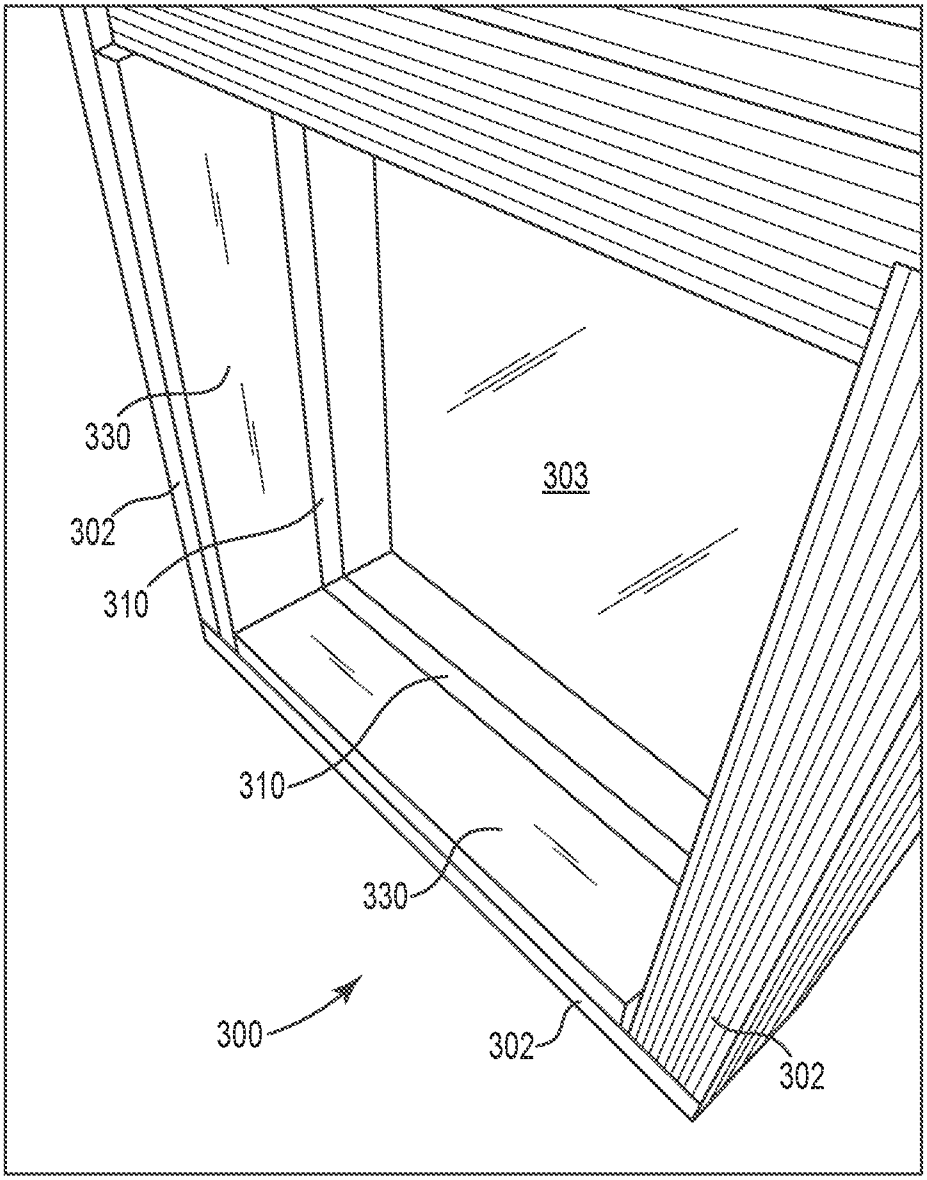
FIG. 9 is a perspective view of one illustrative embodiment of a fenestration unit including a pair of trim members retained using a trim retainer system as described herein.

FIG. 9 is a perspective view of one illustrative embodiment of a fenestration unit 300 including a pair of trim members 330 attached to frame members 302. As depicted, trim members 330 are advanced into contact with glass stops 310 located proximate the major surface 303 of the glass lite installed in fenestration unit 300. The arrangement between the retainer channel depth relative to the stop edges of the trim members 330 and positioning of the retainer clips provides the ability for advancement of trim members 330 into contact with the glass stops 310 such that no gap is present between trim members 330 and glass stops 310.

While the frame channels and channel fins of embodiments of the trim retainer systems described herein provide one way of attaching the retainer clips to frame members of fenestration units as described herein, the retainer clips of trim retainer systems as described herein may be attached to the frame members using a variety of techniques and/or combinations of one or more techniques including, but not limited to, adhesives, mechanical fasteners, thermal and/or chemical welding, etc.

In another alternative embodiment as discussed briefly above, while the frame channels 108 may extend over the full length of each of the frame members 102 (which can be easily accomplished in the form a saw kerf or a continuous channel formed in an extrusion/pultrusion process, the frame channels may be provided in the form of discrete depressions/openings provided in the frame member, with the retainer clips including complementary posts or other protrusions configured to fit into the depressions/openings to retain the retainer clips in a selected position on a frame member.

Figure 10:
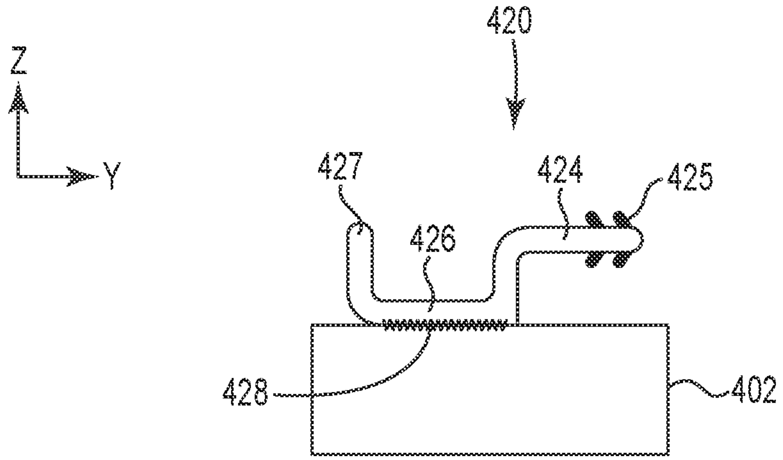
FIG. 10 is an end view of another illustrative embodiment of a retainer clip that may be used in one or more embodiments of trim retainer systems as described herein.

FIG. 10 depicts one illustrative embodiment of a retainer clip 420 attached to the surface 406 of a frame member 402 that does not involve the use of a frame channel and complementary channel fin. The retainer clip 420 includes a trim fin 424 having retention features 425 located thereon. Retainer clip 420 includes a base member 426 to which the trim fin 424 is attached along with an optional trim member support arm 427 located on opposite side of the base member 426 from the trim fin 424. The retainer clip 420 is attached to the surface 406 of frame member 402 using, in the depicted embodiment, adhesive 428 positioned between base member 426 and surface 406 of frame member 402.

Figure 11:
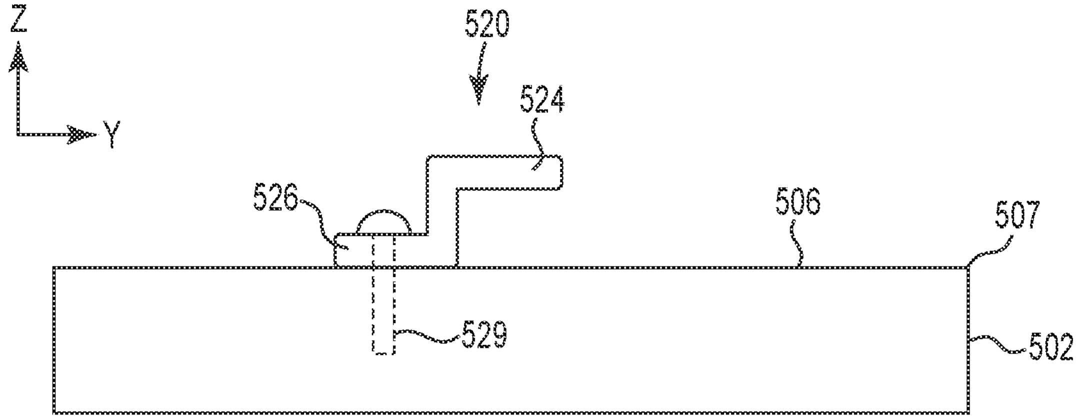
FIG. 11 is an end view of another illustrative embodiment of a retainer clip that may be used in one or more embodiments of trim retainer systems as described herein.

FIG. 11 depicts another illustrative embodiment of a retainer clip 520 attached to the surface 506 of a frame member 502 of a fenestration unit. Retainer clip 520 includes a trim fin 524 extending towards an interior edge 507 of the frame member 502 as well as a base member 526 attached to the surface 506 of frame member 502, the base member 526 supporting the trim fin 524 above the surface 506. In one or more embodiments, the trim fin 524 may include, if necessary, retention features as described herein. In one or more embodiments, base member 526 may provide additional stability and/or rigidity to the retainer clip 530 to support the trim fin 524 and/or retain a trim member in position as described herein.

Retainer clip 520 is attached to the surface 506 of frame member 502 using a mechanical fastener 529 extending through the base member 526 and into frame member 502. Although the depicted embodiment of mechanical fastener 529 has the appearance of a nail/brad/pin, any suitable mechanical fastener could be used such as, but not limited to, nails, brads, pins, rivets, staples, threaded fasteners, etc.

The various components used in the trim retainer systems described herein may be constructed of any suitable material or combination of materials including polymers, metals, composites, wood, ceramic, etc. The particular materials used need only perform the functions of the various components as described herein and suitable choices for the materials will be known to those of skill in the art.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of trim retainer systems and methods of using the same are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A trim retainer system comprising:

a glass lite positioned in a frame opening defined by a plurality of frame members, wherein the glass lite comprises a pair of major surfaces facing opposite directions within the frame opening;

a plurality of glass stops positioned on the frame members defining the frame opening, wherein each glass stop comprises a lite surface facing a first major surface of the glass lite and a trim surface facing away from the first major surface of the glass lite; and a plurality of retainer clips, wherein each retainer clip of the plurality of retainer clips is attached to one frame member of the plurality of frame members between the glass stop and an interior edge of the one frame member, and wherein each retainer clip of the plurality of retainer clips comprises a trim fin extending away from the glass stop and the first major surface of the glass lite; and a plurality of trim members, wherein each trim member of the plurality of trim members is positioned adjacent a selected frame member of the plurality of frame members and comprises a stop edge facing the first major surface of the glass lite and a retainer channel opening towards the first major surface of the glass lite;

wherein each trim member is retained in position adjacent the selected frame member and the glass stop positioned in the selected frame member by one or more retainer clips of the plurality of retainer clips, wherein, for each trim member of the plurality of trim members, the trim fin of the one or more retainer clips is located in the retainer channel;

and wherein each retainer clip of the one or more retainer clips comprises:

a base member positioned adjacent a frame surface of the selected frame member, the base member extending from the trim fin towards the glass stop, and a trim member support attached to the base member and extending away from the frame surface of the selected frame member, wherein the trim member support contacts and supports the trim member above the frame surface of the selected frame member at a location between the retainer channel and the glass stop.

2. A system according to claim 1, wherein, for each trim member of the plurality of trim members, the retainer channel comprises a retainer channel depth measured in a direction normal to the first major surface of the glass lite, and wherein the trim fin of the one or more retainer clips occupies less than all of the depth of the retainer channel when the stop edge of the trim member contacts the trim surface of the glass stop located between the trim member and the glass lite.

3. A system according to claim 1, wherein the trim fin of the one or more retainer clips defines a trim fin plane oriented generally transverse to the first major surface of the glass lite.

4. A system according to claim 1, wherein, for each trim member of the plurality of trim members, the trim fin of the one or more retainer clips is spaced apart from a frame surface of the selected frame member such that a portion of the trim member is located between the trim fin and the frame surface of the selected frame member.

5. A system according to claim 1, wherein each frame member of the plurality of frame members comprises a frame channel formed in the frame member, wherein the frame channel is positioned between the trim surface of a glass stop positioned on the frame member and the interior edge of the frame member in which the frame channel is located;

wherein each retainer clip of the plurality of retainer clips comprises a channel fin;

and wherein, for each trim member of the plurality of trim members, the channel fin of the one or more retainer clips is located in the frame channel of the selected frame member.

6. A system according to claim 5, wherein at least a portion of the trim member support is located closer to the glass stop than the frame channel.

7. A system according to claim 5, wherein, for each trim member of the plurality of trim members, the retainer channel is located between the channel fin of the one or more retainer clips and the interior edge of the selected frame member.

8. A system according to claim 5, wherein the channel fin of each retainer clip of the plurality of retainer clips comprises a first channel fin and wherein each retainer clip further comprises a second channel fin separated from the first channel fin by the base member;

wherein the frame channel of each frame member of the plurality of frame members comprises a first frame channel and wherein each frame member comprises a second frame channel formed in the frame member, wherein the second frame channel is positioned between the trim surface of the glass stop positioned on the frame member and the first frame channel;

and wherein, when the first channel fin is located in the first frame channel and the second channel fin is located in the second frame channel, the base member rests on a frame surface of the frame member located between the first frame channel and the second frame channel.

9. A system according to claim 8, wherein the trim fin of each retainer clip of the plurality of retainer clips comprises a first trim fin and wherein each retainer clip comprises a second trim fin, wherein the first trim fin extends away from the first channel fin and the glass lite, and wherein the second trim fin extends away from the second channel fin and towards the glass lite such that the first trim fin and the second trim fin extend away from each other in opposite directions.

10. A system according to claim 9, wherein the second trim fin is configured to support the trim member above the frame surface at a location between the second frame channel and the trim face of the glass stop.

11. A trim retainer system comprising:

a glass lite positioned in a frame opening defined by a plurality of frame members, wherein the glass lite comprises a pair of major surfaces facing opposite directions within the frame opening;

a plurality of glass stops positioned on the frame members defining the frame opening, wherein each glass stop comprises a lite surface facing a first major surface of the glass lite and a trim surface facing away from the first major surface of the glass lite; and a plurality of retainer clips, wherein each retainer clip of the plurality of retainer clips is attached to one frame member of the plurality of frame members between the glass stop and the interior edge, and wherein each retainer clip of the plurality of retainer clips comprises a trim fin extending away from the glass stop and the first major surface of the glass lite; and a plurality of trim members, wherein each trim member of the plurality of trim members is positioned adjacent a selected frame member of the plurality of frame members and comprises a stop edge facing the first major surface of the glass lite and a retainer channel opening towards the first major surface of the glass lite;

wherein each trim member is retained in position adjacent the selected frame member and the glass stop positioned on the selected frame member by one or more retainer clips of the plurality of retainer clips, wherein, for each trim member of the plurality of trim members, the trim fin of the one or more retainer clips is located in the retainer channel, wherein the retainer channel comprises a retainer channel depth measured in a direction normal to the first major surface of the glass lite, and wherein the trim fin of the one or more retainer clips occupies less than all of the depth of the retainer channel when the stop edge of the trim member contacts the trim surface of the glass stop located between the trim member and the glass lite;

wherein each retainer clip of the one or more retainer clips comprises:

a base member positioned adjacent a frame surface of the selected frame member, the base member extending from the trim fin towards the glass stop, and a trim member support attached to the base member and extending away from the frame surface of the selected frame member, wherein the trim member support is contacts and supports the trim member above the frame surface of the selected frame member at a location between the retainer channel and the glass stop;

wherein one or more frame members of the plurality of frame members comprises a frame channel formed in the frame member, wherein the frame channel is positioned between the trim surface of a glass stop positioned on the one or more frame members and an interior edge of the one or more frame members in which the frame channel is located;

wherein each retainer clip of the plurality of retainer clips comprises a channel fin;

and wherein, for each trim member of the plurality of trim members, the channel fin of the one or more retainer clips is located in the frame channel of the one or more frame members.

12. A method of retaining a trim member in a frame opening of a frame, the method comprising:

locating a plurality of retainer clips along a perimeter of a glass lite located in a frame opening of a frame, wherein locating each retainer clip of the plurality of retainer clips comprises attaching the retainer clip to a frame member of the frame between a trim surface of a glass stop positioned on the frame member proximate the glass lite and an interior edge of the frame member, and wherein each retainer clip of the plurality of retainer clips comprises a trim fin extending away from the glass lite towards the interior edge of the frame member;

attaching a trim member to the frame member such that the glass stop is located between the trim member and the glass lite, wherein the trim member comprises a stop edge and a retainer channel, wherein attaching the trim member comprises positioning the trim member adjacent the frame member with the stop edge contacting the trim surface of the glass stop and the trim fin of one or more retainer clips of the plurality of retainer clips positioned in the retainer channel; and contacting and supporting at least a portion of the trim member above a frame surface of the frame member at a location between the retainer channel and the glass stop using the plurality of retainer clips.

13. A method according to claim 12, wherein the retainer channel comprises a retainer channel depth measured in a direction normal to a first major surface of the glass lite, and wherein the trim fin of the one or more retainer clips of the plurality of retainer clips occupies less than all of the depth of the retainer channel when the stop edge of the trim member contacts the trim surface of the glass stop.

14. A method according to claim 12, wherein attaching the trim member comprises advancing the trim member in a direction normal to a plane defined by the glass lite to position the trim member adjacent the frame member with the stop edge contacting the trim surface of the glass stop and the trim fin of the one or more retainer clips of the plurality of retainer clips positioned in the retainer channel.

15. A method according to claim 12, wherein the trim fin of the one or more retainer clips is spaced apart from a frame surface of the frame member such that a portion of the trim member is located between the trim fin and the frame surface of the frame member.

16. A method according to claim 12, wherein each retainer clip of the plurality of retainer clips comprises a base member positioned adjacent a frame surface of the frame member, wherein the base member extends from the frame channel towards the glass stop.

17. A method according to claim 12, wherein attaching each retainer clip of the plurality of retainer clips to the frame member comprises locating a channel fin of the retainer clip in a frame channel formed in a frame member of the frame, wherein the frame channel is positioned between a trim surface of a glass stop positioned on the frame member proximate the glass lite and an interior edge of the frame member.

18. A method according to claim 17, wherein the retainer channel is located between the channel fin of each retainer clip of the plurality of retainer clips and the interior edge of the selected frame member.

19. A method according to claim 12, wherein each retainer clip of the plurality of retainer clips comprises a base member positioned adjacent a frame surface of the frame member, wherein the base member extends from the retainer channel towards the glass stop, and a trim member support attached to the base member, the trim member support extending away from the frame surface of the frame member at a location between the retainer channel and the glass stop, and wherein supporting the trim member above the frame surface comprises supporting the trim member using the trim member supports of the plurality of retainer clips.

* * * * *